United States Patent
Ranjan et al.

(10) Patent No.: US 10,456,685 B2
(45) Date of Patent: Oct. 29, 2019

(54) IDENTIFYING AND TRACKING OBJECTS VIA LIGHTING PATTERNS

(71) Applicant: Nintendo Co., Ltd, Redmond, WA (US)

(72) Inventors: Sharad Ranjan, Redmond, WA (US); Subramania Sudharsanan, Woodinville, WA (US)

(73) Assignee: Nintendo Co., Ltd., Kyoto (JP)

( * ) Notice: Subject to any disclaimer, the term of this patent is extended or adjusted under 35 U.S.C. 154(b) by 166 days.

(21) Appl. No.: 14/686,574

(22) Filed: Apr. 14, 2015

(65) Prior Publication Data

US 2016/0307332 A1 Oct. 20, 2016

(51) Int. Cl.
| | |
|---|---|
| G06K 9/00 | (2006.01) |
| G06K 9/20 | (2006.01) |
| G06K 9/32 | (2006.01) |
| G06T 7/246 | (2017.01) |
| H04N 5/225 | (2006.01) |
| H04N 5/247 | (2006.01) |
| A63F 13/213 | (2014.01) |
| A63F 13/235 | (2014.01) |
| A63F 13/428 | (2014.01) |
| A63F 13/5258 | (2014.01) |

(52) U.S. Cl.
CPC ........ *A63F 13/5258* (2014.09); *A63F 13/213* (2014.09); *A63F 13/235* (2014.09); *A63F 13/428* (2014.09); *G06K 9/00771* (2013.01); *G06K 9/2027* (2013.01); *G06T 7/246* (2017.01); *H04N 5/2256* (2013.01); *H04N 5/247* (2013.01); *G06K 2009/3291* (2013.01); *G06T 2207/10152* (2013.01); *G06T 2207/30204* (2013.01)

(58) Field of Classification Search
None
See application file for complete search history.

(56) References Cited

U.S. PATENT DOCUMENTS

| | | | | |
|---|---|---|---|---|
| 7,627,139 | B2 * | 12/2009 | Marks | A63F 13/00 345/156 |
| 2007/0273766 | A1 * | 11/2007 | Wilson | G01S 3/7864 348/169 |
| 2008/0080789 | A1 * | 4/2008 | Marks | A63F 13/06 382/296 |

(Continued)

*Primary Examiner* — Jiangeng Sun
(74) *Attorney, Agent, or Firm* — Lee & Hayes, P.C.

(57) ABSTRACT

Techniques and systems for tracking multiple objects over a common time period and identifying (i.e., disambiguating) the objects from one another. As described herein, each object may include a respective light source (e.g., one or more LEDs) that may illuminate according to a defined lighting pattern. One or more cameras may capture images of a scene that includes the objects and the images may be analyzed to identify a location of each respective light source within the scene. By identifying these locations over multiple images, the movement of each object may be determined. In some instances, a system that tracks the movement of the objects may iterate through instructing each of the objects to illuminate its light source according to an identification lighting pattern, while other light source(s) of the other respective object(s) continue illuminating their light sources according to a default lighting pattern.

20 Claims, 7 Drawing Sheets

(56) References Cited

U.S. PATENT DOCUMENTS

| | | | | |
|---|---|---|---|---|
| 2010/0062854 A1* | 3/2010 | Goto | ............... | A63F 13/06 |
| | | | | 463/36 |
| 2011/0309149 A1* | 12/2011 | Testa | ............... | G06K 7/10544 |
| | | | | 235/462.01 |
| 2012/0050535 A1* | 3/2012 | Densham | ............... | H04N 5/2224 |
| | | | | 348/159 |
| 2012/0170939 A1* | 7/2012 | Schenk | ............... | H05B 33/0863 |
| | | | | 398/106 |
| 2013/0050426 A1* | 2/2013 | Sarmast | ............... | G01S 17/89 |
| | | | | 348/46 |
| 2014/0080607 A1* | 3/2014 | Goto | ............... | A63F 13/06 |
| | | | | 463/37 |
| 2014/0166911 A1* | 6/2014 | Hotelling | ............... | G08C 23/04 |
| | | | | 250/578.1 |
| 2014/0184896 A1* | 7/2014 | Imafuji | ............... | G03B 7/16 |
| | | | | 348/371 |
| 2015/0248189 A1* | 9/2015 | Routley | ............... | G06F 1/1673 |
| | | | | 345/175 |
| 2018/0050264 A1* | 2/2018 | He | ............... | A63F 13/428 |

* cited by examiner

IDENTIFYING AND TRACKING OBJECTS VIA LIGHTING PATTERNS

BACKGROUND

Computer-vision techniques may be used for identifying an object within a scene and tracking a position of this object within the scene. For instance, computer-vision techniques may identify the object within an image based on visual characteristics of the object and may track movement of the object through subsequent images. In some instances, multiple objects may be tracked within a single scene. Here, each of the objects should be identified—that is, disambiguated from each other object—in order to accurately track movement of the objects within the scene.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
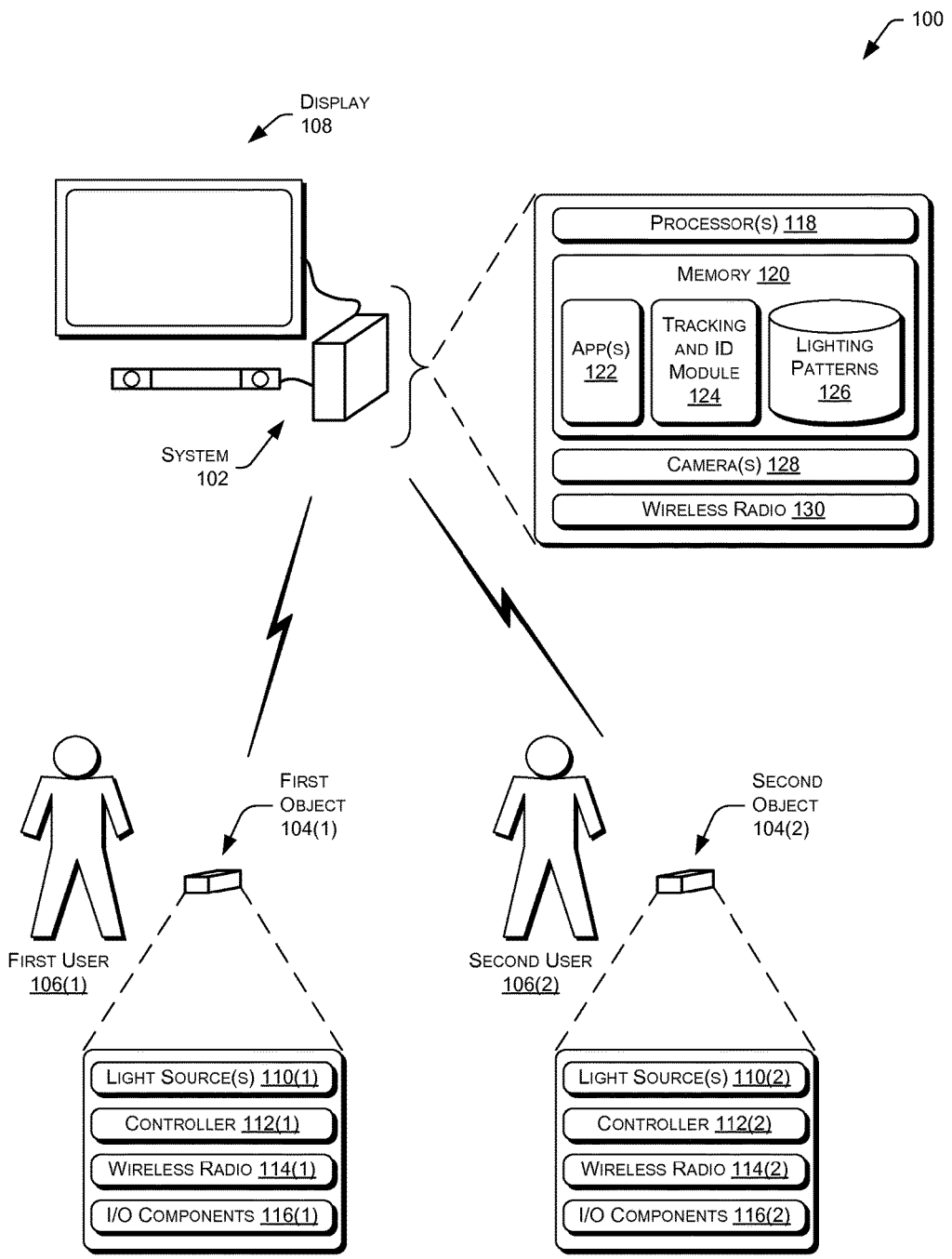
FIG. 1 illustrates an example environment that includes a system configured to identify and track multiple objects in a scene. In this example, the system is a game console that includes cameras for tracking and identifying two game controllers, each of which includes a light source and a controller to illuminate a respective light source according to a predefined lighting pattern.

Some implementations described herein include techniques and systems for tracking multiple objects over a common time period and identifying (i.e., disambiguating) the objects from one another. As described below, each object may include a respective light source (e.g., one or more LEDs, LCDs, etc.) that may illuminate according to a defined lighting pattern. One or more cameras may capture images of a scene that includes the objects and the images may be analyzed to identify a location of each respective light source within the scene. By identifying these locations over multiple images, the movement of each object may be determined.

In some instances, a system that tracks the movement of the objects may iterate through instructing each of the objects to illuminate its light source according to an identification lighting pattern, while other light source(s) of the other respective object(s) continue illuminating their light sources according to a default lighting pattern. For instance, envision that the system is tracking three objects within a scene. During a first time period, the system may instruct a first object to illuminate its light source according to the identification lighting pattern, while the remaining two objects continue to illuminate their light sources according to the default lighting pattern. The system may then analyze images captured during the first time period to identify the object performing the unique identification pattern—the first object. In addition, the system may track movement of all three objects over the first time period given that all three objects have been illuminating their light sources according to some lighting pattern.

After a set amount of time elapses or after identifying the first object, the system may instruct the second object to illuminate its light source according to the identification lighting pattern, while the first and the third objects illuminate their light sources according to the default lighting pattern. The system may then analyze images captured during the second time period to identify the second object and to track movement of all three objects during the second time period.

After the set amount of time again elapses or after identifying the second object, the system may instruct the third object to illuminate its light source according to the identification lighting pattern, while the first and the second objects illuminate their light sources according to the default lighting pattern. The system may then analyze images captured during the third time period to identify the third object and to track movement of all three objects during the second time period.

At this point, the system has identified all three objects—while continuing to track all three objects—with the use of a unique identification lighting pattern (utilized by a single object at any given time in the scene) and a default lighting pattern (utilized by each object other than the object being identified at the given time). After all three objects have been identified, the system may at some point in the future again iterate through the identification process. For instance, among other possibilities, the system may continuously iterate through this process, may iterate through this process periodically, and/or may iterate through this process if two objects come within a threshold distance of one another in the scene (thus bringing into question the identification of the objects).

The system may communicate with the objects being identified and tracked in any manner, such as over any combination of wired or wireless networks. In some instances, the system communicates with the objects over a short-range wireless radio communication connection, such as Bluetooth®. The lighting patterns, meanwhile, may represent a pulsing pattern where an object's light source transitions between different brightness states (e.g., off and on), a wavelength (e.g., visible or otherwise) pattern where the light source changes wavelengths over time, or a combination thereof. In the instances where a lighting pattern comprises a wavelength-pattern, the light may change color according to a predefined pattern, may change wavelengths in the non-visible spectrum, or a combination thereof. The light source may comprise one or more lights and, in some instances, comprises an LED that pulses between an on and an off state according to the particular lighting pattern it is implementing. For instance, one or more objects may implement a default lighting pattern at a one time, such OFF, ON, OFF, ON, while one other object implements an identification pattern at that time, such as OFF, ON, ON, OFF, ON, ON. As described above, the system may iterate through instructing each object to perform the identification lighting pattern, and each object not performing the identification lighting pattern at any given time may be configured to perform the default lighting pattern.

The tracking and identification of the objects using the default and identification lighting patterns may be used for an array of reasons. In one example, the system comprises a game console and the objects that are tracked and identified are wireless game controllers configured to control operation of the game console. In another example, the objects may be attached to people such that the people's interactions are identified and tracked through a scene. Of course, while a few examples are described, it is to be appreciated that the techniques may apply to any instance where object movement is tracked.

For discussion purposes, some example implementations are described below with reference to the corresponding figures. However, implementations herein are not limited to the particular examples provided, and may be extended to other environments, other system architectures, and so forth, as will be apparent to those of skill in the art in light of the disclosure herein.

FIG. 1 illustrates an example environment 100 that includes a system 102 configured to identify and track multiple objects in a scene, such as a first object 104(1) and a second object 104(2). In this example, the system 102 is a game console that includes cameras for tracking and identifying two game controllers operated by respective users 106(1) and 106(2). In this example, the users operate the game console using the game controllers, while the system 102 couples to a display 108 for providing visual feedback to the users 106(1) and 106(2).

In the illustrated example, each of the example objects includes a respective light source 110(1), 110(2), controller 112(1), 112(2), wireless radio 114(1), 114(2), and one or more input/output (I/O) components 116(1), 116(2) such as buttons, triggers, and the like. The system 102, meanwhile, includes one or more processors 118 and memory 120, which may store one or more applications 122 (e.g., games), a tracking and identification (ID) module 124, and one or more lighting patterns 126. The system may also include one or more cameras 128 and a wireless radio 130. Depending on the configuration of the system 102, the memory 120 may be an example of tangible non-transitory computer storage media and may include volatile and nonvolatile memory and/or removable and non-removable media implemented in any type of technology for storage of information such as computer-readable processor-executable instructions, data structures, program modules or other data. The memory 120 may include, but is not limited to, RAM, ROM, EEPROM, flash memory, solid-state storage, magnetic disk storage, optical storage, and/or other computer-readable media technology. Further, in some cases, the system 102 may access external storage, such as RAID storage systems, storage arrays, network attached storage, storage area networks, cloud storage, or any other medium that can be used to store information and that can be accessed by the processors 118 directly or through another computing device or network. Accordingly, the memory 120 may be computer storage media able to store instructions, modules or components that may be executed by the processors 118. Further, when mentioned, non-transitory computer-readable media exclude media such as energy, carrier signals, electromagnetic waves, and signals per se.

In some instances, the objects 104(1), 104(2) may illuminate their light sources 110(1), 110(2) according to a lighting pattern, while the cameras 128 capture images of the environment 100. The tracking and identification module 124 may then analyze the images to identify the objects and track the movement of the objects through the environment. In some instances, the one or more cameras 128 include at least two cameras for identifying the location of the objects in three-space (X, Y, Z) in the environment through stereoscopic vision. In other examples, the one or more cameras 128 may comprise a single camera for identifying the X, Y locations based on identifying the light sources of the objects in the captured images and identifying the Z locations of the objects based on the brightness of the light sources in the images. In addition, and as discussed below, the objects may take turns performing an identification lighting pattern to enable the tracking and identification module 124 to identify the respective objects 104(1) and 104(2).

To provide an example, the controllers 112(1), 112(2) may be configured to illuminate the respective light sources 110(1), 110(2) according to one or more lighting patterns, such as pulsing patterns. The controllers 112(1), 112(2) may be implemented in hardware, software, or a combination thereof. In some instances, the controllers 112(1), 112(2) may be configured to implement a default lighting pattern unless instructed otherwise. For instance, the controllers 112(1), 112(2) may pulse the respective light sources 110(1), 110(2) according to an OFF, ON, OFF, ON pattern. The tracking and identification module 124, meanwhile, may periodically instruct one of the controllers to implement an identification lighting pattern that is unique from the default lighting pattern, for the purpose of identifying the instructed object. For instance, the tracking and identification module 124 may first instruct the first controller 112(1) to implement the identification pattern for a certain amount of time (during which the controller 112(2) implements the default pattern), after which the module 124 may instruct the controller 112(2) to implement the identification pattern for a certain amount of time (during which the controller 112(1) implements the default pattern). In some instances, the wireless radio 130 periodically sends these instructions to the respective wireless radios 114(1) and 114(2).

After instructing the first controller 112(1) to implement the identification pattern (e.g., OFF, ON, ON, OFF, ON, ON) for a first period of time, the module 124 may analyze images captured during this time period to identify the first object 104(1) (via the first light source 110(1)), as well as to track the movement of the first object 104(1) and the second object 104(2) (the latter of which was implementing the default pattern during the first time period). At the expiration of the first time period, the module 124 may instruct the second controller 112(2) to implement the identification pattern for a second time period. The module 124 may then analyze images captured by the cameras 128 during the second time period to identify the second object 104(2) and to track movement of both the first and second objects. Of course, while FIG. 1 illustrates two objects 104(1) and 104(2), the system 102 may be configured to identify and track any number of objects.

Figure 2:
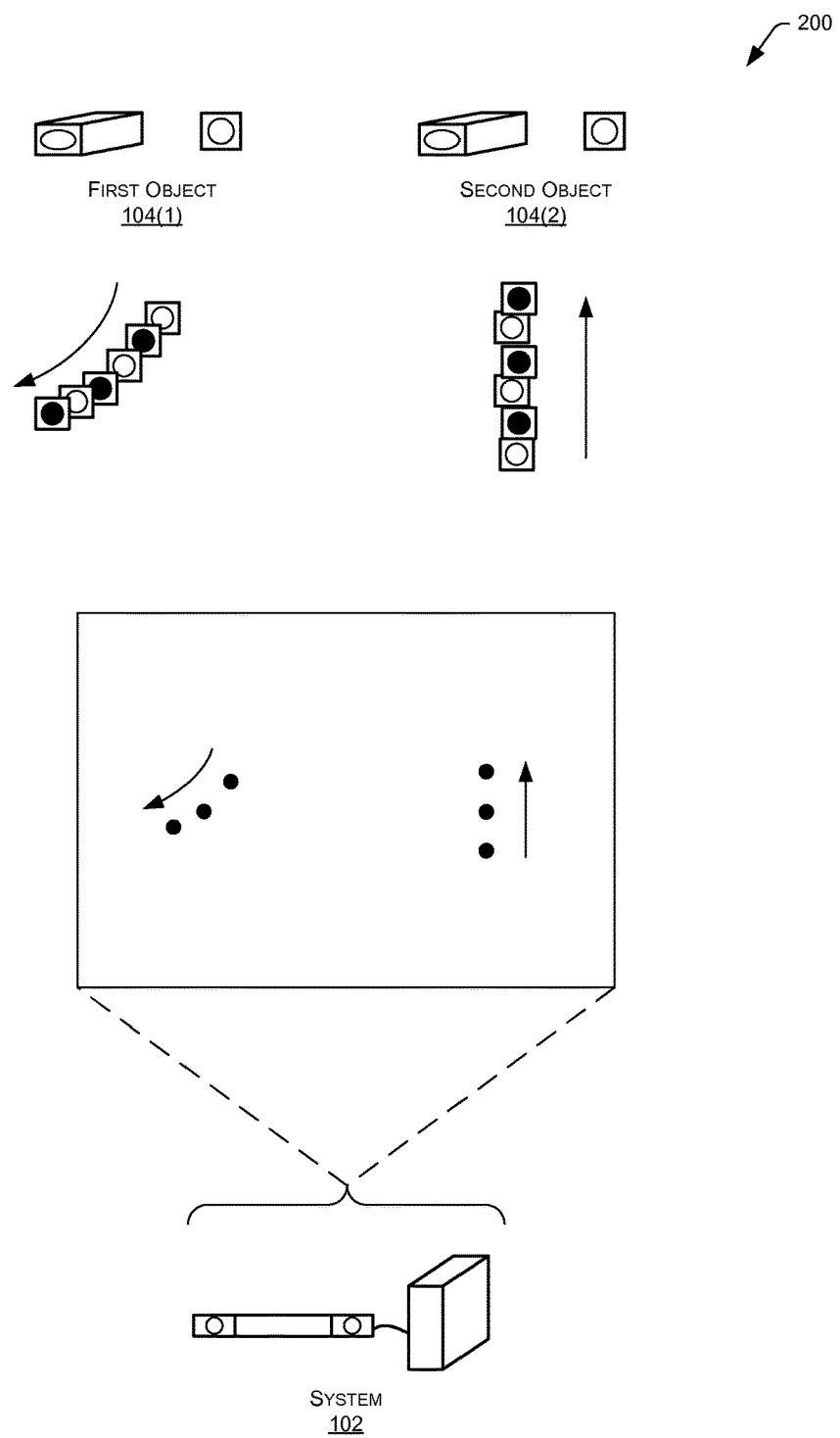
FIG. 2 illustrates an example scenario of the system of FIG. 1 tracking the two objects of FIG. 1 as these objects move within the scene and as their respective light sources pulse between an on state and an off state.

FIG. 2 illustrates an example scenario 200 of the system 102 tracking the two objects 104(1) and 104(2) as these objects move within the scene and as their respective light sources pulse between an on state and an off state. That is, the system 102 in this example tracks these objects within the scene as each of the objects illuminates its light source according to an example default lighting pattern.

As shown, in this example each object may include an LED or other light source on a front face of the object pointed toward the cameras of the system 102. The controller of the respective object may oscillate between illuminating the light source and turning off the light source. Initially, the camera and the controllers of the objects may be synchronized such that the camera captures an image of the scene each time one or more of objects change from an on state to an off state and vice versa. To do so, the camera and each of the objects 104(1), 104(2) may share timestamp information such that an offset between the clocks may be calculated. This offset may be taken into account then to ensure that the cameras capture an image each time a light source changes state.

As noted, each light source is configured to synchronously iterate between an off and on state. The cameras of the system 102 may capture an image each time the light sources of the object change state—that is, each time the light sources are turned on or off. The system 102 may then subtract an image in which the light source was off from a subsequent image in which the light source was on. By subtracting the images in this manner, the system 102 is able to acutely identify the light source in the second image and accurately track an object through multiple images (i.e., over time). In the example, the system 102 identifies that the first object 104(1) moves downwards and to the left over a first time period, while the second object 104(2) moves generally upwards over the same time period.

Figure 3:
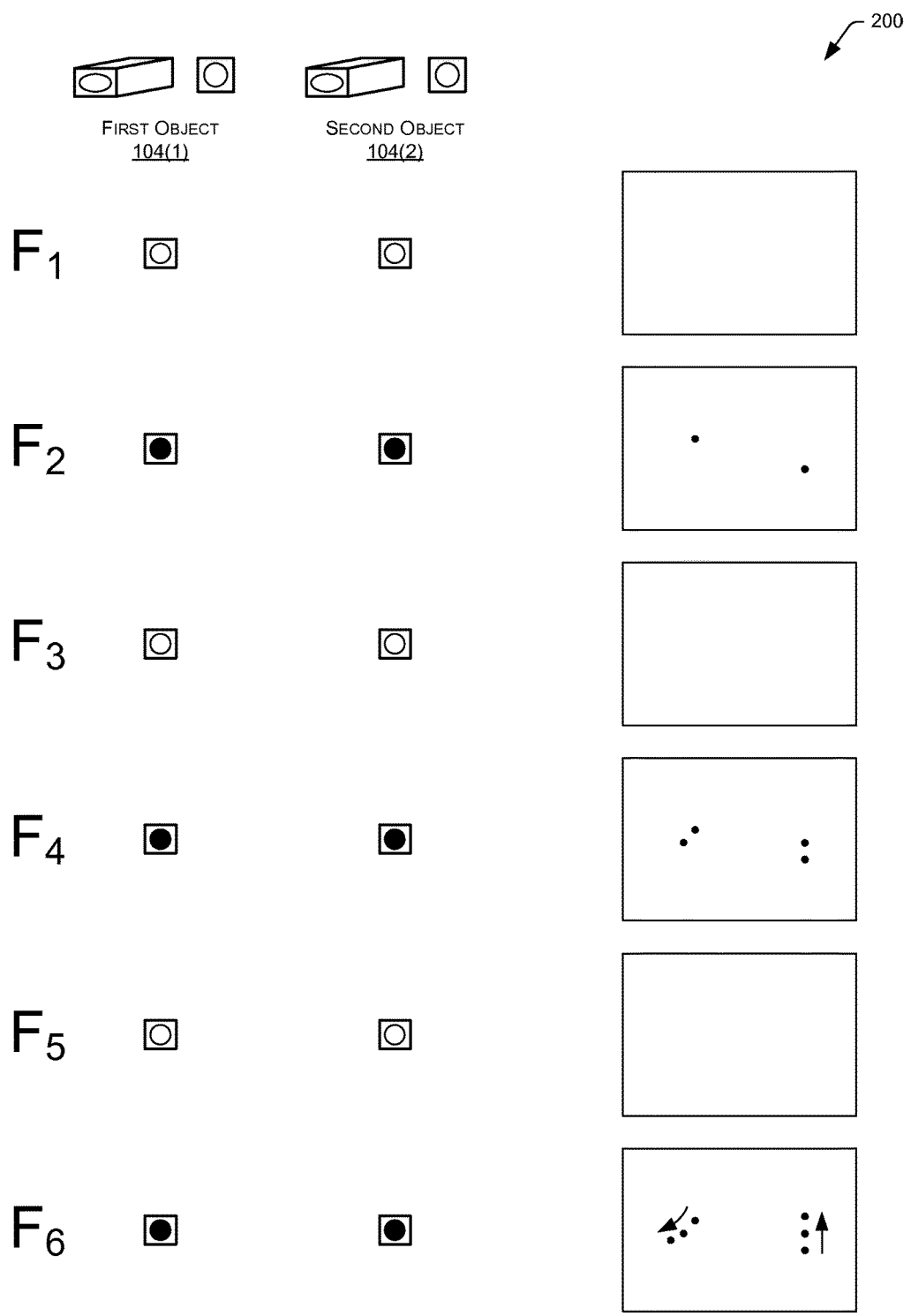
FIG. 3 illustrates the scenario of FIG. 2 in further detail, illustrating a frame-by-frame analysis for tracking the objects within the scene.

FIG. 3 illustrates the scenario 200 in further detail, illustrating a frame-by-frame analysis for tracking the objects within the scene. As illustrated, given that both the first and second objects 104(1) and 104(2) are implementing the default lighting pattern, in the first frame ($F_1$) both light sources are currently in an off state. Therefore, the image captured by the camera at the first frame does not illustrate either of the light sources. In the second frame, however, both light sources are now on, as reflected in the illustration. In other words, the system 102 may have identified the light corresponding to both light sources by subtracting the image taken at $F_1$ from the image taken at $F_2$. As FIG. 3 illustrates, the system 102 may continue to track the light sources (and, hence, the objects) over time as the light sources continue to implement the default lighting pattern. As described below, however, the system 102 may also periodically iterate through instructing individual objects to implement an identification lighting pattern for the purpose of both disambiguating the objects from one another while continuing to track movement of these objects.

Figure 4:
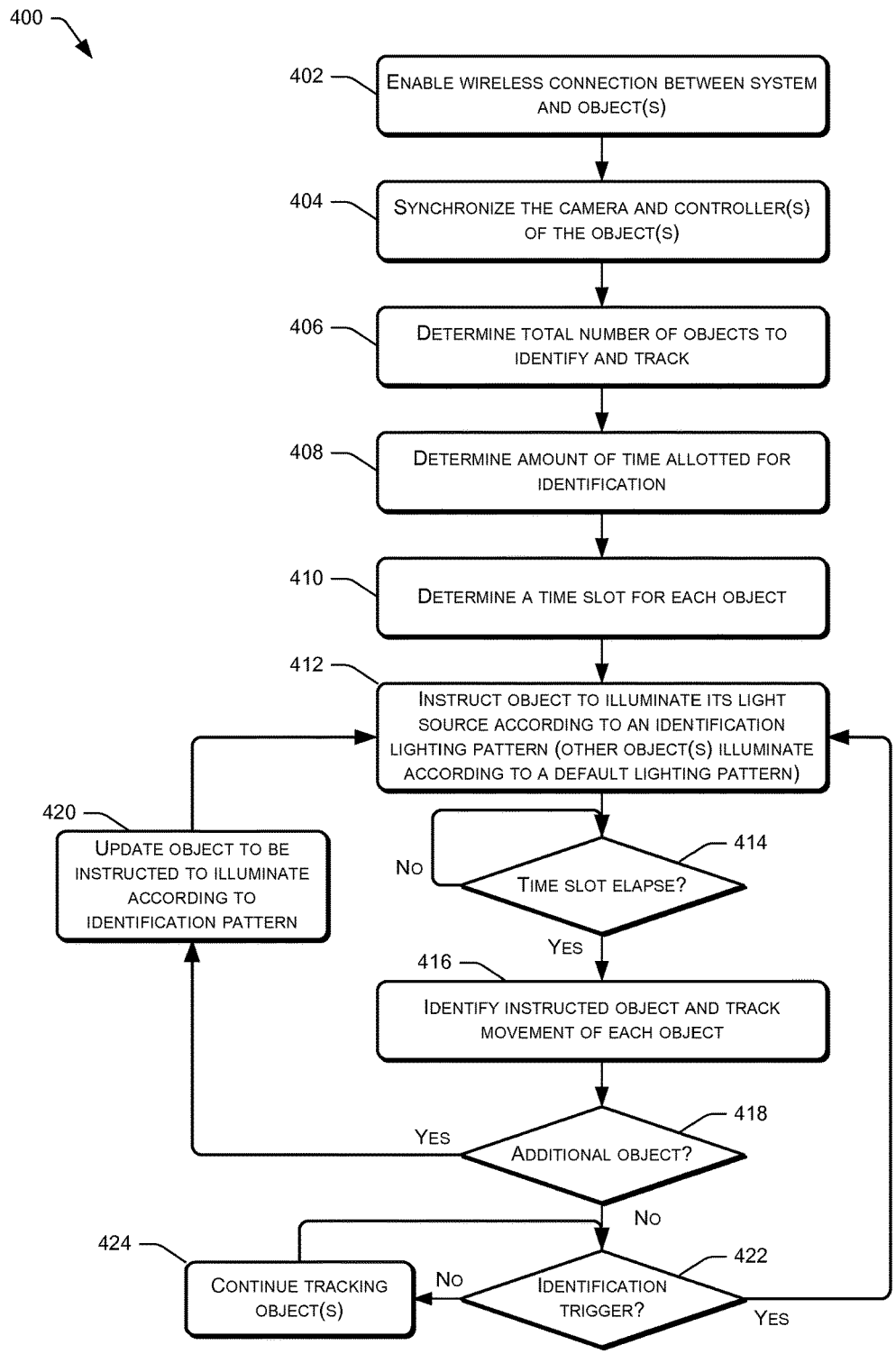
FIG. 4 illustrates a flow diagram of an example process for both identifying and tracking objects within a scene, such as the scene of FIG. 1.

FIG. 4 illustrates a flow diagram of such an example process 400 for both identifying and tracking objects within a scene, such as the scene of FIG. 1. The process 400 and other processes described herein are illustrated as collections of blocks in logical flow diagrams, which represent a sequence of operations, some or all of which can be implemented by logic from hardware, software or a combination thereof. In the context of software or firmware, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems.

As illustrated, the process 400 includes, at 402, enabling a wireless connection between a system and one or more objects that are to be tracked. As described above, in some instances this connection may comprise a short-range wireless communication, such as Bluetooth®. At 404, the process then synchronizes a clock of the camera with a clock of each object to be tracked. For instance, each object may utilize a controller for instructing the object's respective light source to turn on or off, and the controller may itself reference a clock. The system and each object may therefore share timestamp information regarding their respective clocks for calculating an offset between the clocks. The system and/or the objects may then use these offsets to synchronize the illumination (i.e., state change) of the light sources with the capturing of the images by the camera. In some instances, the controllers of the objects may send their timestamp information to the system, while in other instances the system may send timestamp information to the objects. In either case, the process 400 may periodically re-synchronize the object controllers and the system to ensure that the camera is accurately capturing images when the light sources are changing state.

At 406, the process 400 may determine a total number of objects that are to be identified tracked. For instance, the system and the objects may each communicate over the wireless connection and the system may determine how many objects, such as game controllers, are to be identified and tracked. At 408, the process 400 determines an amount of time allotted for identification and, at 410, determines a time slot during which each object is to be identified. For instance, the process 400 may determine that it is programmed to identify all objects every 100 ms and, given that it is tracking four objects (for example), may assign each object a time slot of 25 ms beginning with the first object, and so forth.

At 412, the process 400 instructs a first object to illuminate its light source according to an identification pattern. This identification pattern may be unique relative to the default lighting pattern that each other object implements during this first time period. At 414, the process 400 queries as to whether or not the time slot for the first object has elapsed. When the time slot (e.g., the first 25 ms) elapses, in this illustration at 416 the process 400 identifies the first object by identifying the light source in the captured images that utilized the unique identification lighting pattern. The process 400 also tracks movement of this object, as well as each other object being tracked. Of course, while the process 400 illustrates the identification and tracking of 416 as occurring after the time slot elapses, in practice the process 400 may identify the first object and track all of the objects during this entire time slot.

At 418, the process 400 queries as to whether there is an additional object to identify. If so, then at 420 the process 400 updates the object that is to implement the identification pattern (e.g., from the first object to the second object) and proceeds to instruct the second object to illuminate its light source according to the identification pattern, while the other objects utilize the default lighting pattern. Again, the process 400 may proceed to identify the second object as well as track all of the objects over this second time period.

When each object has been identified (e.g., all four objects in this example), at 418 the process 400 may determine that there are no additional objects to identify and may proceed to 422. At 422, the process 400 queries whether an identification trigger has occurred. If not, then at 424 the process 400 may continue tracking each object within the scene until an identification trigger does occur. When the process 400 is tracking—and not identifying—objects, all objects may implement the default lighting pattern.

When an identification trigger occurs, however, the process 400 may return to 412 to again instruct one of the objects to illuminate according to the identification pattern and may again sequentially identify each object while simultaneously tracking all objects. In some instances, a system may be configured to identify objects periodically and, therefore, an identification trigger may occur upon the lapsing of a set amount of time. For instance, the system may be configured to repeat the 100 ms identification portion of the process every 0.5 seconds. Additionally or alternatively, an identification trigger may occur when two objects within a scene are determined to come within a certain threshold distance of one another, thus making subsequent visual disambiguation between the objects difficult.

Figure 5:
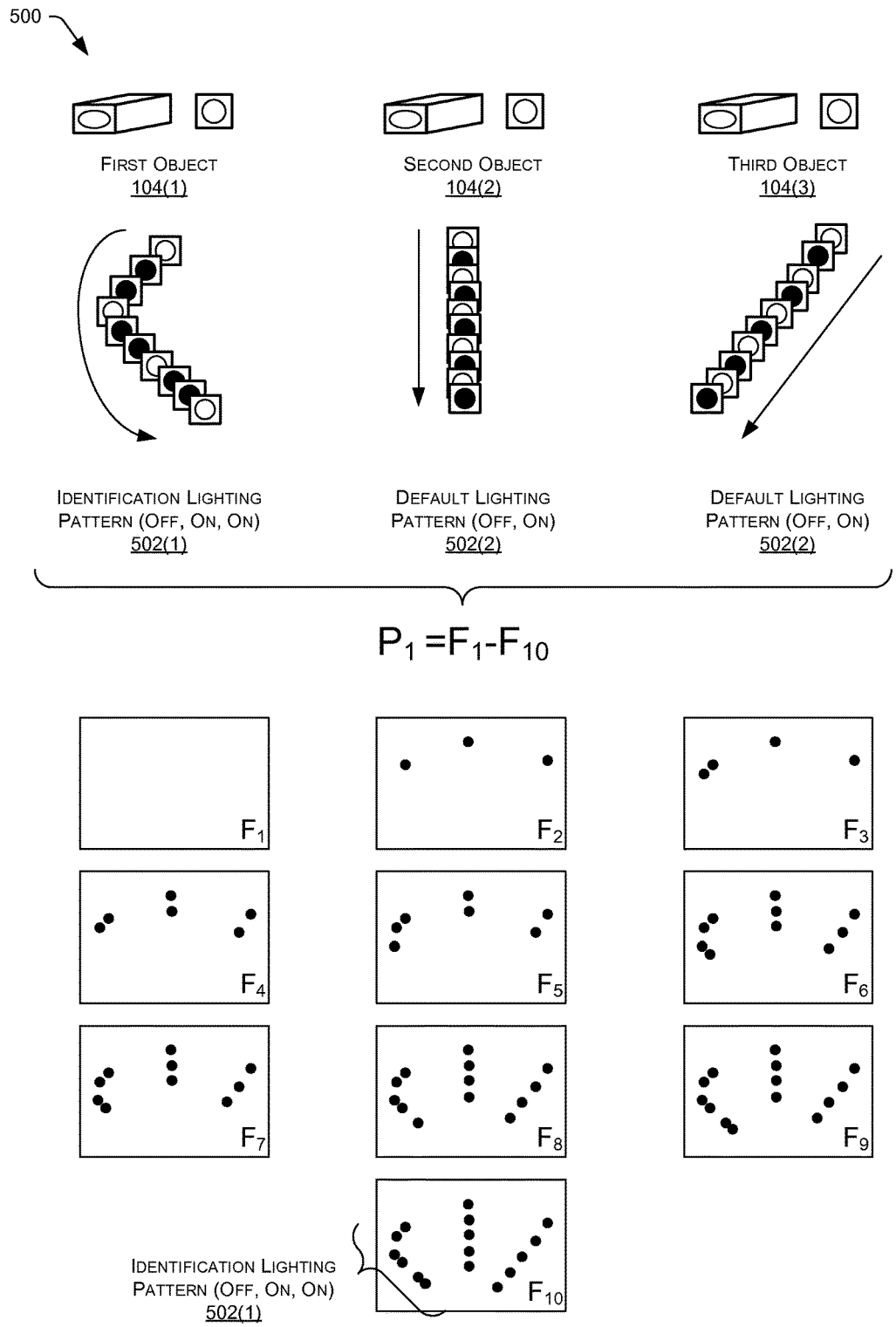
FIG. 5 illustrates an example scenario of identifying a first of three objects while tracking the three objects within a scene. In some instances, after the first object is identified using an identification lighting pattern, the second object may be identified in this manner, and so forth, thus allowing for periodic identification of the objects while continuously tracking movement of each object within the scene.

FIG. 5 illustrates an example scenario 500 of identifying a first of three objects 104(1), 104(2), 104(3) while tracking the three objects within a scene. In this example, during a first example period ($P_1$) of ten frames ($F_1$-$F_{10}$) the first object 104(1) implements an identification lighting pattern 502(1) while the second and third objects implement a default lighting pattern 502(2). In this example, the identification lighting pattern 502(1) comprises OFF, ON, ON, OFF, ON, ON while the default lighting pattern 502(2) comprises OFF, ON, OFF, ON.

As illustrated, over the course of the example ten frames the system (using the cameras 128 and the tracking and identification module 124) is able to identify the object 104(1) that is utilizing the identification lighting pattern 502(1), while still tracking the movement of all three objects. That is, the module 124 is able to analyze the frames of the first time period to determine that one of the objects being tracked is illuminating its light according to the identification pattern of OFF, ON, ON while the remaining objects are illuminating their light sources according to the default pattern of OFF, ON. Therefore, the system may designate the object utilizing the identification pattern as the first object 104(1) (which the system instructed to the implement the identification pattern) while still tracking the remaining objects. In some instances, after the first object 104(1) is identified using the identification lighting pattern 502(1), the second object 104(2) may be identified in this manner, and so forth, thus allowing for periodic identification of the objects while continuously tracking movement of these objects within the scene.

Figure 6:
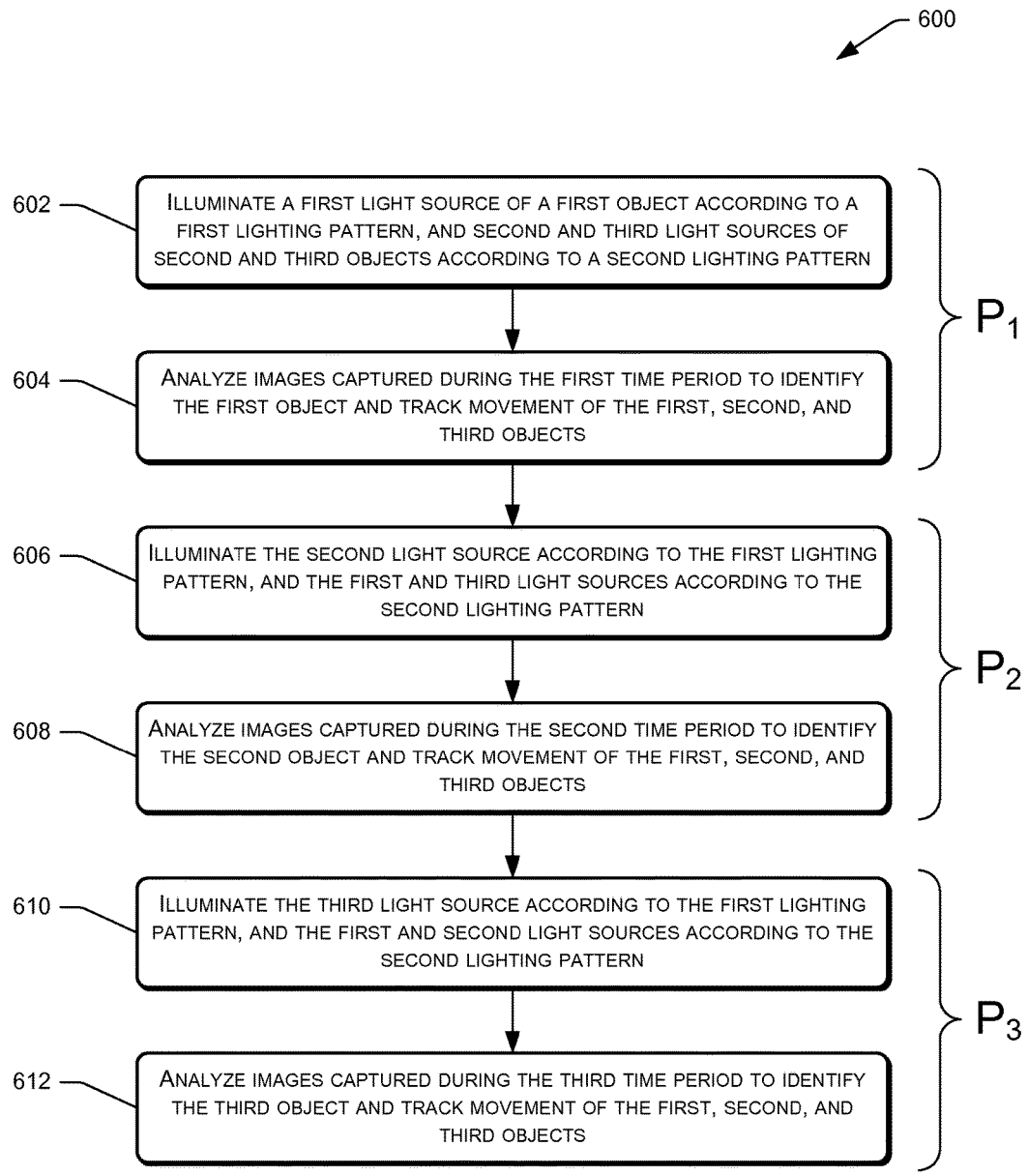
FIG. 6 illustrates a flow diagram of an example process for sequentially illuminating objects according to an identification lighting pattern for the purpose of identifying these objects without interrupting the simultaneous tracking of all of the objects.

FIG. 6 illustrates a flow diagram of an example process 600 for sequentially illuminating objects according to an identification lighting pattern for the purpose of identifying these objects without interrupting the simultaneous tracking of all of the objects. At 602, the process 600 illuminates a first light source of a first object according to a first lighting pattern over a first time period ($P_1$), while illuminating a second light source of a second object and a third light source of a third object according to a second lighting pattern. At 604, the process 600 analyzes images captured during the first time period to identify the first object and to track movement of the first, second and third objects.

At 606, the process 600 illuminates the second light source of the second object according to the first lighting pattern over a second time period ($P_2$), while illuminating the first light source of the first object and the third light source of the third object according to the second lighting pattern. At 608, the process 600 analyzes images captured during the second time period to identify the second object and to track movement of the first, second and third objects.

At 610, the process 600 illuminates the third light source of the third object according to the first lighting pattern over a third time period ($P_3$), while illuminating the first light source of the first object and the second light source of the second object according to the second lighting pattern. At 612, the process 600 analyzes images captured during the third time period to identify the third object and to track movement of the first, second and third objects. While FIG. 6 illustrates the identification and tracking of three objects, it is to be appreciated that the process 600 may continue for any number of objects to be tracked.

Figure 7:
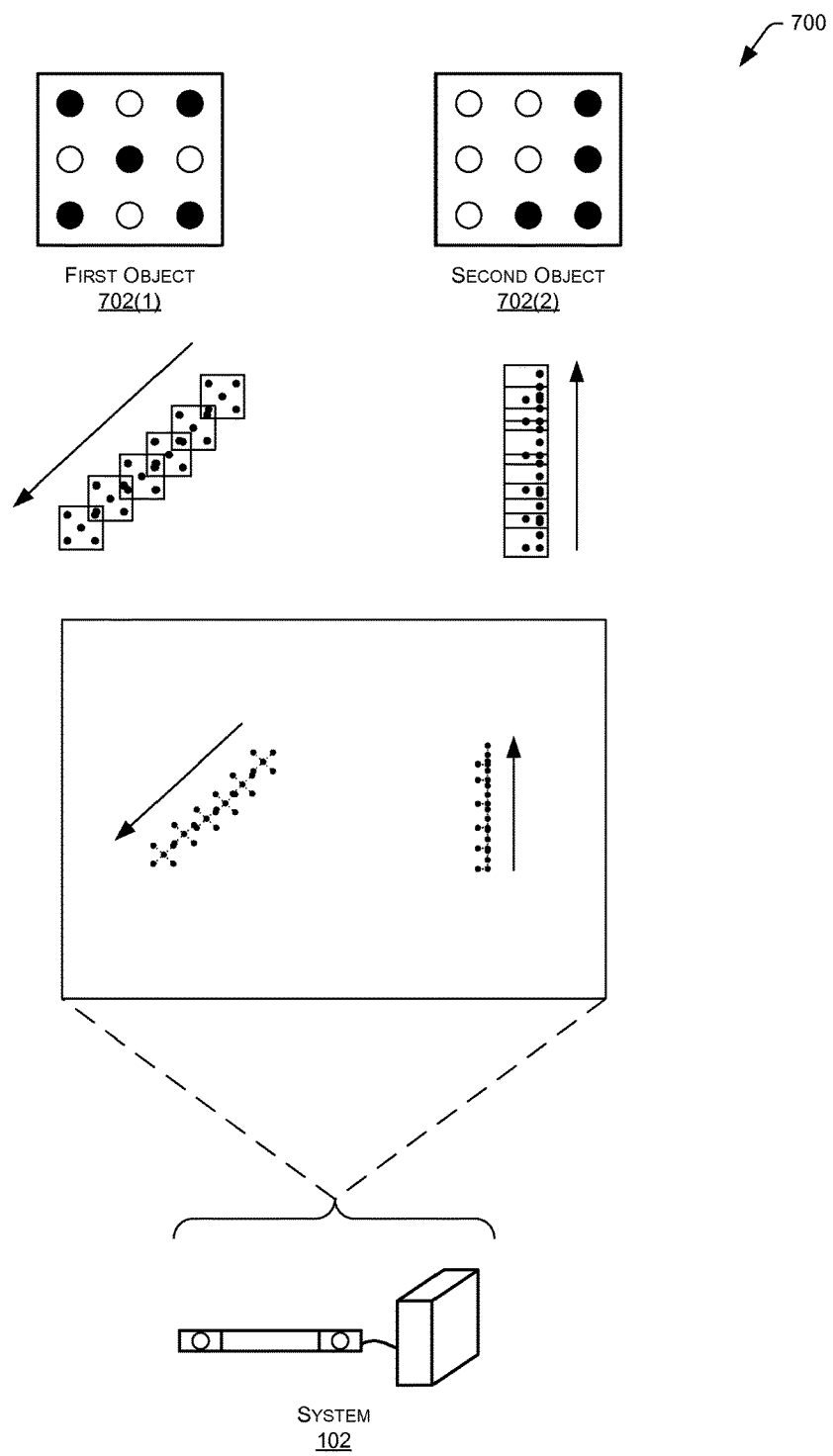
FIG. 7 illustrates an example scenario where multiple objects may be tracked based on each object having a different number and/or pattern of light sources illuminated, with each number and/or the pattern identifying the respective object.

FIG. 7 illustrates an example scenario 700 where multiple objects 702(1), 702(2) may be tracked based on each object having a different number and/or pattern of light sources illuminated, with each number and/or the pattern identifying the respective object. That is, rather than objects utilizing different pulsing or wavelength-based lighting patterns, the objects 702(1) and 702(2) may each "light up" a unique array of lights (e.g., LEDs) that are used to identify each respective object.

In the illustrated example, for instance, each object includes an M×N array of lights (in this case 3×3). The system 102 may instruct each object to light (or the objects may be pre-programmed to light) a certain set of lights of the M×N matrix, with this set uniquely identifying each respective object. In the illustration, for instance, the first object 702(1) is illuminated in the form of an "X" while the second object 702(2) is illuminated in the form of a reverse "L". The system 102 may then identify these lighting shapes in images captured by the cameras 128 for the purpose of both identifying the objects and tracking them over time. It is to be appreciated that while FIG. 7 illustrates the available lights in the form of an M×N matrix, in other instances the available lights may be arranged circularly or in any other arrangement.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system, comprising:
   one or more cameras configured to capture images of a first controller and a second controller, the first controller including a first light source and the second controller including a second light source;
   one or more processors; and
   one or more computer-readable media storing computer-executable instructions that, when executed by the one or more processors, cause the one or more processors to perform acts comprising:
  causing the first controller to pulse the first light source according to an identification pulsing pattern during a first time period;
  causing the second controller to pulse the second light source according to a default pulsing pattern during the first time period, the identification pulsing pattern differing from the default pulsing pattern, wherein the identification pulsing pattern includes at least one of a first light pulse rate or a first light wavelength and the default pulsing pattern includes at least one of a second light pulse rate or a second light wavelength;
  receiving, from the one or more cameras, first images captured during the first time period, wherein the first images correspond to the identification pulsing pattern and the default pulsing pattern;
  detecting the identification pulsing pattern within the first images;
  detecting the default pulsing pattern within the first images;
  identifying the first controller based at least in part on detecting the identification pulsing pattern within the first images;
  tracking a movement of the first controller and a movement of the second controller;
  causing the second controller to pulse the second light source according to the identification pulsing pattern during a second time period;
  causing the first controller to pulse the first light source according to the default pulsing pattern during the second time period;
  receiving, from the one or more cameras, second images captured during the second time period, wherein the second images correspond to the identification pulsing pattern and the default pulsing pattern;
  detecting the identification pulsing pattern within the second images;
  detecting the default pulsing pattern within the second images;
  identifying the second controller based at least in part on detecting the identification pulsing pattern within the second images; and
  tracking the movement of the first controller and the movement of the second controller.

2. The system as recited in claim 1, wherein the one or more computer-readable media further store computer-executable instructions that, when executed by the one or more processors, cause the one or more processors to perform an act comprising configuring the one or more cameras to capture one or more respective images each time the first light source changes from an on state to an off state or from the off state to the on state.

3. The system as recited in claim 1, wherein the one or more computer-readable media further store computer-executable instructions that, when executed by the one or more processors, cause the one or more processors to perform an act comprising periodically synchronizing the one or more cameras with the first controller and the second controller such that the one or more cameras capture images each time the first light source or the second light source changes state.

4. The system as recited in claim 1, wherein:
  the first controller comprises hardware, software, or a combination thereof; and
  the second controller comprises hardware, software, or a combination thereof.

5. The system as recited in claim 1, wherein:
  the system comprises a game console;
  the first controller comprises a first wireless game controller for controlling an operation of the game console; and
  the second controller comprises a second wireless game controller for controlling the operation of the game console.

6. A method, comprising:
  causing a first object in an environment to illuminate a first light source associated with the first object according to a first lighting pattern;
  causing a second object in the environment to illuminate a second light source associated with the second object according to a second lighting pattern, the second lighting pattern differing from the first lighting pattern, wherein the first lighting pattern includes at least one of a first light pulse rate or a first light wavelength and the second lighting pattern includes at least one of a second light pulse rate or a second light wavelength;
  capturing, over a first time period, first images of the environment while the first light source is illuminated according to the first lighting pattern and the second light source is illuminated according to the second lighting pattern;
  analyzing the first images to identify the first object within the environment based at least in part on the first lighting pattern;
  analyzing the first images to identify the second object within the environment based at least in part on the second lighting pattern;
  causing the second object to illuminate the second light source according to the first lighting pattern;
  causing the first object to illuminate the first light source according to the second lighting pattern;
  capturing, over a second time period, second images of the environment while the first light source is illuminated according to the second lighting pattern and the second light source is illuminated according to the first lighting pattern;
  analyzing the second images to identify the first object within the environment based at least in part on the second lighting pattern; and
  analyzing the second images to identify the second object within the environment based at least in part on the first lighting pattern.

7. The method as recited in claim 6, further comprising based at least in part on the analyzing the first images:
  tracking, during the first time period, a movement of the first object; and
  tracking, during the first time period, a movement of the second object.

8. The method as recited in claim 7, further comprising based at least in part on the analyzing the second images:
  tracking, during the second time period, a movement of the first object; and
  tracking, during the second time period, a movement of the second object.

9. The method as recited in claim 6, further comprising synchronizing one or more cameras associated with the environment with the first light source and the second light source such that the one or more cameras capture images when at least one of the first light source or the second light source transitions from at least one of an off state to an on state or from the on state to the off state.

10. The method as recited in claim 6, wherein:
the first object comprises a first wireless controller of a game console; and
the second object comprises a second wireless controller of the game console.

11. The method as recited in claim 6, wherein the causing the first object to illuminate the first light source according to the first lighting pattern occurs over a short-range wireless radio communication connection;
the causing the second object to illuminate the second light source according to the second lighting pattern occurs over the short-range wireless radio communication connection;
the causing the second object to illuminate the second light source according to the first lighting pattern occurs over the short-range wireless radio communication connection; and
the causing the first object to illuminate the first light source according to the second lighting pattern occurs over the short-range wireless radio communication connection.

12. The method as recited in claim 6, further comprising:
determining a total number of objects to identify;
determining a total number of objects to track;
determining an amount of time allotted to identify the total number of objects; and
calculating, based on the total number of objects and the amount of time allotted, an amount of time to allot to each of the objects to illuminate a respective light source according to the first lighting pattern.

13. A method, comprising:
causing, during a first time period, a first controller to pulse a first light source according to an identification pulsing pattern;
causing, during the first time period, a second controller to pulse a second light source according to a default pulsing pattern, the identification pulsing pattern differing from the default pulsing pattern, wherein the identification pulsing pattern includes at least one of a first light pulse rate or a first light wavelength and the default pulsing pattern includes at least one of a second light pulse rate or a second light wavelength;
receiving, from one or more cameras, first images captured during the first time period, wherein the first images correspond to the identification pulsing pattern and the default pulsing pattern;
detecting the identification pulsing pattern within the first images;
detecting the default pulsing pattern within the first images;
identifying the first controller based at least in part on detecting the identification pulsing pattern within the first images;
tracking movement of the first controller and movement of the second controller;
causing, a second time period, the second controller to pulse the second light source according to the identification pulsing pattern during;
causing, during the second time period, the first controller to pulse the first light source according to the default pulsing pattern;
receiving, from the one or more cameras, second images captured during the second time period, wherein the second images correspond to the identification pulsing pattern and the default pulsing pattern;
detecting the identification pulsing pattern within the second images;
detecting the default pulsing pattern within the second images;
identifying the second controller based at least in part on detecting the identification pulsing pattern within the second images; and
tracking movement of the first controller and movement of the second controller.

14. The method as recited in claim 13, further comprising causing the one or more cameras to capture one or more respective images each time the first light source changes from an on state to an off state or from the off state to the on state.

15. The method as recited in claim 13, further comprising periodically synchronizing the one or more cameras with the first controller and the second controller such that the one or more cameras capture images each time the first light source or the second light source changes state.

16. The method as recited in claim 13, wherein:
the first controller comprises hardware, software, or a combination thereof; and
the second controller comprises hardware, software, or a combination thereof.

17. The method as recited in claim 13, wherein:
the first controller comprises a first wireless game controller for controlling an operation of a game console; and
the second controller comprises a second wireless game controller for controlling the operation of the game console.

18. The method as recited in claim 13, further comprising:
causing, during the first time period, a third light source of a third controller to illuminate according to the default lighting pattern; and
causing, during the second time period, the third light source of the third controller to illuminate according to the default lighting pattern;
identifying the third controller within the first images;
identifying the third controller within the second images;
tracking, during the first time period, movement of the third object; and
tracking, during the second time period, movement of the third object.

19. The method as recited in claim 18, further comprising:
causing, during a third time period, the third light source of the third controller to illuminate according to the identification lighting pattern and the first light source of the first controller and the second light source of the second controller to illuminate according to the default lighting pattern;
receiving, from the one or more cameras, third images captured during the third time period, wherein the third images correspond to the identification pulsing pattern and the default pulsing pattern;
detecting the identification pulsing pattern within the third images;
identifying the third controller based at least in part on detecting the identification pulsing pattern within the third images; and
tracking, during the third time period, movement of the first controller, movement of the second controller, and movement of the third controller.

20. The method as recited in claim 13, further comprising receiving at least one of the first images or the second images at a periodicity substantially equal to or greater than at least one of:
a periodicity at which the first light source is pulsed; or
a periodicity at which the second light source is pulsed.

* * * * *